United States Patent
Kang

(10) Patent No.: US 7,123,449 B2
(45) Date of Patent: Oct. 17, 2006

(54) AIR BEARING SLIDER FOR DISK DRIVE

(75) Inventor: Tae-sik Kang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 447 days.

(21) Appl. No.: 10/762,332

(22) Filed: Jan. 23, 2004

(65) Prior Publication Data

US 2004/0156144 A1 Aug. 12, 2004

(30) Foreign Application Priority Data

Feb. 7, 2003 (KR) ...................... 10-2003-0007755

(51) Int. Cl.
*G11B 5/60* (2006.01)
(52) U.S. Cl. .................................. 360/235.8
(58) Field of Classification Search .. 360/235.4–235.8, 360/236.2–236.9, 236
See application file for complete search history.

(56) References Cited

U.S. PATENT DOCUMENTS

| 5,309,303 | A | 5/1994 | Hsia et al. ................... 360/103 |
| 6,728,070 | B1 * | 4/2004 | Koishi ......................... 360/236 |
| 6,982,851 | B1 * | 1/2006 | Yamamoto et al. ........ 360/235.8 |
| 2002/0001157 | A1 | 1/2002 | Kang et al. ............... 360/236.3 |
| 2002/0030938 | A1 * | 3/2002 | Boutaghou et al. ...... 360/236.3 |
| 2002/0126418 | A1 | 9/2002 | Ueno et al. .............. 360/235.7 |
| 2002/0181153 | A1 | 12/2002 | Kang ....................... 360/236.2 |
| 2004/0156143 | A1 * | 8/2004 | Kang ....................... 360/235.8 |
| 2006/0082928 | A1 * | 4/2006 | Takahashi et al. ....... 360/235.8 |

FOREIGN PATENT DOCUMENTS

| KR | 2000-0015718 | 3/2000 |
| KR | 2002-0003902 | 1/2002 |

\* cited by examiner

*Primary Examiner*—Allen Cao
(74) *Attorney, Agent, or Firm*—Staas & Halsey LLP

(57) ABSTRACT

An air bearing slider of a disk drive for moving a read/write head to a desired position on a disk by being lifted above a surface of the disk includes a body having a surface facing the disk. A first rail base protrudes from the surface of the body facing the disk and has a U shape open to a trailing end portion of the body. A first positive pressure generating rail portion protrudes from the first rail base and includes a cross rail separated from a leading end portion of the first rail base and extending in a first direction perpendicular to a direction in which air enters and a pair of side rails extending from both ends portion of the cross rail in a second direction parallel to the direction in which air enters. A negative pressure cavity is defined by the first rail base. A second rail base protrudes from the surface of the body facing the disk adjacent to the trailing end portion of the body. A second positive pressure generating rail portion protrudes from the second rail base. A negative pressure-generating pocket is formed in each of the side rails and separate from the negative pressure cavity and open to the outside of the side rails.

20 Claims, 10 Drawing Sheets

AIR BEARING SLIDER FOR DISK DRIVE

CROSS-REFERENCE TO RELATED APPLICATIONS

This application claims the priority of Korean Patent Application No. 2003-7755 filed on Feb. 7, 2003 in the Korean Intellectual Property Office, the disclosure of which is incorporated herein in its entirety by reference.

BACKGROUND OF THE INVENTION

1. Field of the Invention

The present invention relates to an air bearing slider for a disk drive, and more particularly, to an air bearing slider for a disk drive which can minimize the lowering of the flying height due to differences in elevations or altitudes.

2. Description of the Related Art

A disk drive, for example, a hard disk drive (HDD), is one of many auxiliary memory devices of a computer that is used to record data on the disk or reproduce stored data from the disk by using a read/write head.

FIG. 1 is a perspective view illustrating part of a typical hard disk drive. Referring to FIG. 1, a typical hard disk drive includes a magnetic disk (hard disk) 10 which is a recording medium for data recording, a spindle motor 20 for rotating the disk 10, a read/write head 31 for recording data on the disk 10 or reproducing data stored on the disk 10, and an actuator 30 for moving the read/write head 31 to a predetermined position on the disk 10.

The actuator 30 includes an actuator arm 36 rotated by a voice coil motor (not shown), an air bearing slider 32 where the read/write head 31 is mounted, and a suspension 34 installed at one end portion of the actuator arm 36 and supporting the air bearing slider 32 to be elastically biased toward a surface of the disk 10. The air bearing slider 32 having the read/write head 31 is lifted to a predetermined height above the disk 10 to maintain a predetermined gap between the read/write head 31 and the disk 10.

When the rotation of the disk 10 is stopped, the slider 32 is parked in a landing zone 11 provided on a surface of an inner circumferential side of the disk 10. However, as the disk 10 starts to rotate, a lifting force generated by airflow applies to a lower surface of the slider 32, that is, to an air-bearing surface, thus lifting the slider 32. The slider 32 is lifted to a height where a lifting force created by the rotation of the disk 10 and an elastic force created by the suspension 34 are balanced. The slider 32 in a lifted state is moved to a data zone 12 of the disk 10 according to a rotation of the actuator arm 36. The read/write head 31 mounted on the slider 32 records and reproduces data from the disk 10 while maintaining a predetermined gap with the rotating disk 10.

The air bearing slider described above has a variety of structures. An example thereof, is the basic structure of a conventional TF (taper flat) type air bearing slider illustrated in FIG. 2.

Referring to FIG. 2, a TF type air bearing slider 40 has a body 42 having a thin block shape. Two rails 44 extending in a lengthwise direction of the body 42 are formed to a predetermined height on one surface of the body 42, that is, on a surface facing the disk. An inclined surface 46 is formed at a leading end portion of each of the rails 44. In the above structure, when air flow is created in a direction indicated by an arrow A by the rotation of the disk, air is compressed on the inclined surface 46, thus applying positive pressure to the surface of each of the rails 44, and creating a lifting force which lifts the slider 40 above the surface of the disk.

However, in the TF type air bearing slider 40, the lifting force gradually increases as the rpm of the disk increase, gradually increasing the flying height. The rpm of a disk and the flying height are almost linearly proportional.

In the meantime, an NP (negative pressure) type air bearing slider which can maintain a constant flying height by generating a negative pressure as well as pulling the slider toward a surface of a disk is increasingly adopted. FIG. 3 shows a basic structure of a conventional NP type air bearing slider.

Referring to FIG. 3, two rails 54 extending in a lengthwise direction of a body 52 of an NP type air bearing slider 50 are formed on one surface of the body 52, that is, a surface facing a disk (not shown). A cross rail 58 extending in a widthwise direction of the body 52 is formed between the rails 54. An inclined surface 56 is formed at a leading end portion of each of the rails 54. The cross rail 58 is formed to have the same height as of the rails 54. In the above structure, when air flow is created by rotation of the disk in a direction indicated by an arrow A, the two rails 54 generate positive pressure at both side portions of the body 52 and the cross rail 58 generates a negative pressure cavity 59 at the central portion of the body 52. At the initial stage of the disk rotation, since the positive pressure is higher than the negative pressure, the slider 50 is lifted. As the speed of rotation of a disk increases, the negative pressure gradually increases. When the disk rotation speed reaches a regular rpm, the positive pressure and the negative pressure are balanced so that the slider 50 is no longer lifted and maintained at a constant flying height.

Forces acting on the above NP type air bearing slider are described in detail with reference to FIG. 4.

Referring to FIG. 4, when a disk 10 rotates in a direction indicated by an arrow D, air flow is formed in a direction indicated by an arrow A between the disk 10 and a surface of a slider 60 facing the disk 10, that is, an air bearing surface. Positive pressure is generated by the airflow on a surface of rails 64 protruding from a low surface of the slider 60, that is, on the air-bearing surface. Accordingly, lifting forces $F_1$ and $F_2$, which lift the slider 60, are generated. In contrast, negative pressure or sub-ambient pressure is generated at a negative pressure cavity 69 of the slider 60 so that a force $F_3$ pulling the slider 60 toward the disk 10 is also generated. In the meantime, gram load $F_4$ by suspension (refer to FIG. 1) acts on the slider 60. As a result, the slider 60 is maintained at a height at which the forces $F_1$, $F_2$, and $F_3$ generated by the above-described positive and negative pressures and the gram load $F_4$ are balanced. As the negative pressure increases, the positive pressure must also increase in order to maintain a balanced state. When the positive pressure and the negative pressure increase in a balanced state, air-bearing stiffness of the slider increases improving dynamic stability.

FIG. 5 shows a detailed example of the conventional NP type air bearing slider, which is disclosed in U.S. Pat. No. 5,309,303.

Referring to FIG. 5, an inclined surface 71 and a cross rail 72 are formed at a leading end portion of a slider 70. Two side rails 73 are formed at both side portions of the slider 70. An island 77 supporting a head 78 protrudes at a tailing end portion of the slider 70. A negative pressure cavity 76 defined by the cross rail 72 and the side rails 73 is formed at the central portion of the slider 70. A first groove 74 connecting the negative pressure cavity 76 and the outside of the slider 70 is formed at the leading end portion of each of the side rails 73 across the side rails 73. The first groove 74 is inclined with respect to a lengthwise axis of the slider 70 and has the same depth as the negative pressure cavity 76. The first groove 74 has a function of maintaining a gap between each of the side rails 73 and a disk (not shown) to be identical.

Also, a second groove 75 is formed at the tailing end portion of each of the side rails 73. The second groove 75 is open at the side surface edge of each of the side rails 73, but is separated from the negative pressure cavity 76. The second groove 75 has the same depth as the negative pressure cavity 76 and is inclined with respect to a lengthwise axis of the slider 70 to prevent debris from remaining therein. The second groove 75 generates negative pressure at the tailing end portions of the side rails 73 so that the flying height of the slider 70 can be lowered. Thus, according to the structure of the slider 70 shown in FIG. 5, a lower flying height can be obtained, thereby improving the performance of the head 78.

However, in the above-described conventional air bearing sliders, as altitude or elevation increases, flying height is generally lowered. This problem will now be described with reference to FIGS. 6A and 6B.

Referring to FIG. 6A, when the absolute altitude or elevation is 0 m, a slider 80 maintains a predetermined flying height $H_1$, for example, a flying height of 10 nm, above the disk 10 rotating at a regular rpm. The slider 80 is maintained in an inclined state at a predetermined angle as the leading end portion where air enters is lifted higher than the trailing end portion where a head 81 is disposed. The flying height $H_1$ signifies a gap between the trailing end portion of the slider 80 and the disk 10.

However, as the absolute altitude increases, the atmospheric pressure is lowered. Accordingly, the flying height of the conventional air bearing slider 80 is generally lowered due to a decrease in a lifting force. As shown in FIG. 6B, the flying height $H_2$ of the slider 80 at a place where the absolute altitude is about 3,000 m is about 7 nm, which is 30% less than the flying height $H_1$ at the place where the absolute altitude is 0 m. When the flying height of the slider 80 is lowered as the altitude increases, the head 81 easily contacts the disk 10 by a relatively weak impact or vibration. Accordingly, the head 81 is damaged and the lift span is reduced, deteriorating the reliability of a disk drive. In particular, since a lower flying height is needed to improve performance of the head as described above, the lowering of the slider according to the altitude becomes a serious problem.

SUMMARY OF THE INVENTION

To solve the above and/or other problems, the present invention provides an air bearing slider of a disk drive having a structure that can minimize the lowering of a flying height due to differences in altitude or elevation.

According to an aspect of the present invention, an air bearing slider of a disk drive for moving a read/write head to a desired position on a disk by being lifted above a surface of the disk, which comprises a body having a surface facing the disk; a first rail base protruding from the surface of the body facing the disk and having a U shape open to a trailing end portion of the body; a first positive pressure generating rail portion protruding from the first rail base and including a cross rail separated from a leading end portion of the first rail base and extending in a first direction perpendicular to a direction in which air enters and a pair of side rails extending from both end portions of the cross rail in a second direction parallel to the direction in which air enters; a negative pressure cavity defined by the first rail base; a second rail base protruding from the surface of the body facing the disk adjacent to the trailing end portion of the body; a second positive pressure generating rail portion protruding from the second rail base; and a negative pressure generating pocket formed in each of the side rails to be separated from the negative pressure cavity and open to the outside of the side rails.

The negative pressure generating pocket is formed shallower than the negative pressure cavity.

A bottom surface of the negative pressure generating pocket is formed to have the same height of an upper surface of the first rail base.

The negative pressure generating pocket is formed in a lengthwise direction of the side rails.

The negative pressure generating pocket is open to the outside of the side rails through an open portion and the length of the open portion is shorter than the length of the negative pressure generating pocket.

A groove connecting the negative pressure generating pocket and the negative pressure cavity is formed in each of the side rails between the negative pressure generating pocket and the negative pressure cavity.

The depth of the groove connecting the negative pressure generating pocket and the negative pressure cavity is the same as that of the negative pressure generating pocket and the length of the groove is shorter than that of the negative pressure generating pocket.

A third positive pressure generating rail portion protruding on the first rail base is provided at the rear of each of the side rails and the third positive pressure generating rail portion is separated from each of the side rails.

The third positive pressure generating rail portion is formed on an upper surface of the first rail base to have the same height as the first positive pressure generating rail portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A and 6B are views for explaining problems of the conventional air bearing slider, in which FIG. 6A is a view illustrating a flying height of a slider at a place where the absolute altitude is 0 m and FIG. 6B is a view illustrating a flying height of a slider at a place where the absolute altitude is about 3,000 m;

DETAILED DESCRIPTION OF THE PREFERRED EMBODIMENTS

Figure 1:
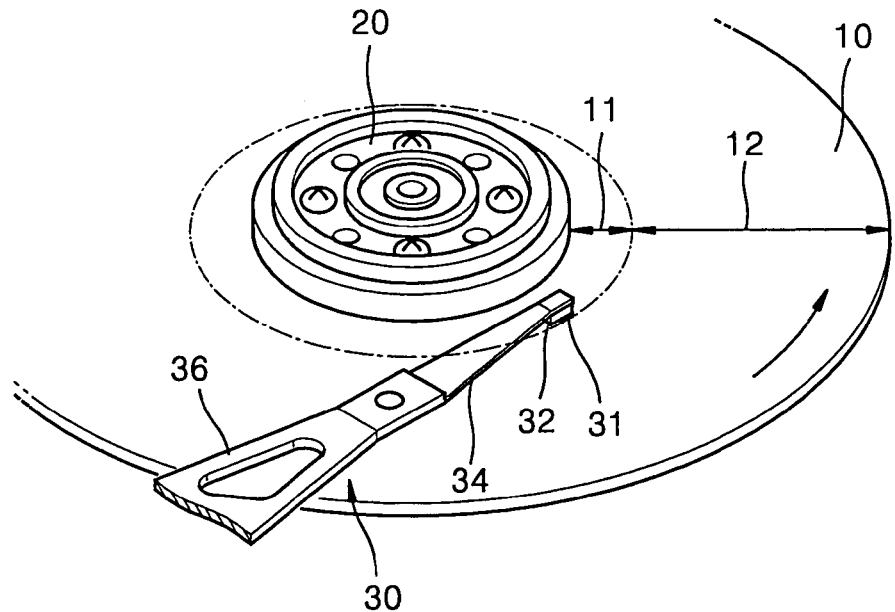
FIG. 1 is a perspective view illustrating part of a typical hard disk drive.
Figure 2:
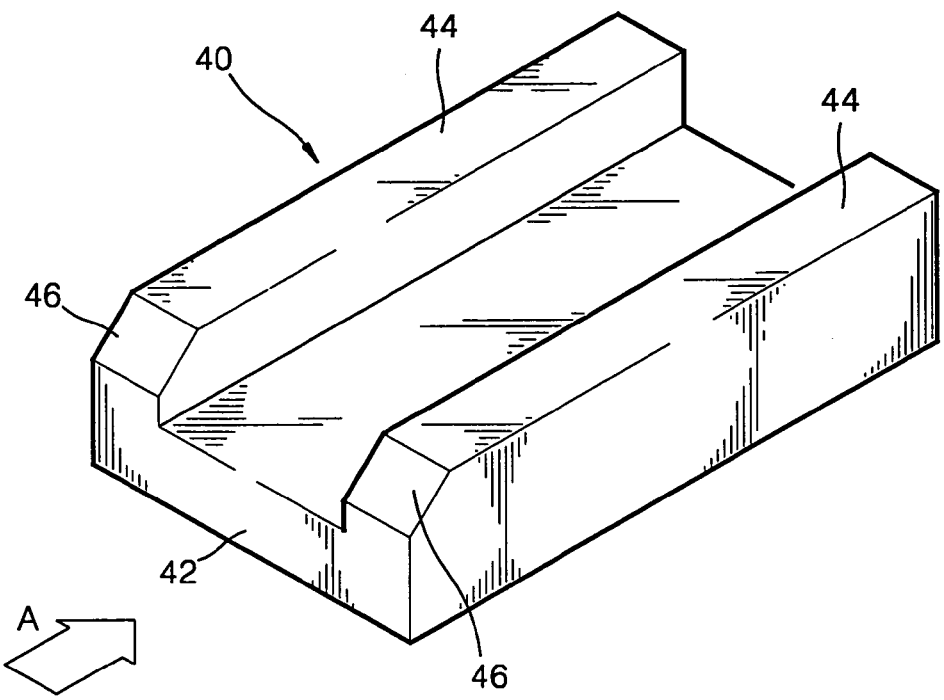
FIG. 2 is a perspective view illustrating a basic structure of a conventional TF type air bearing slider.
Figure 3:
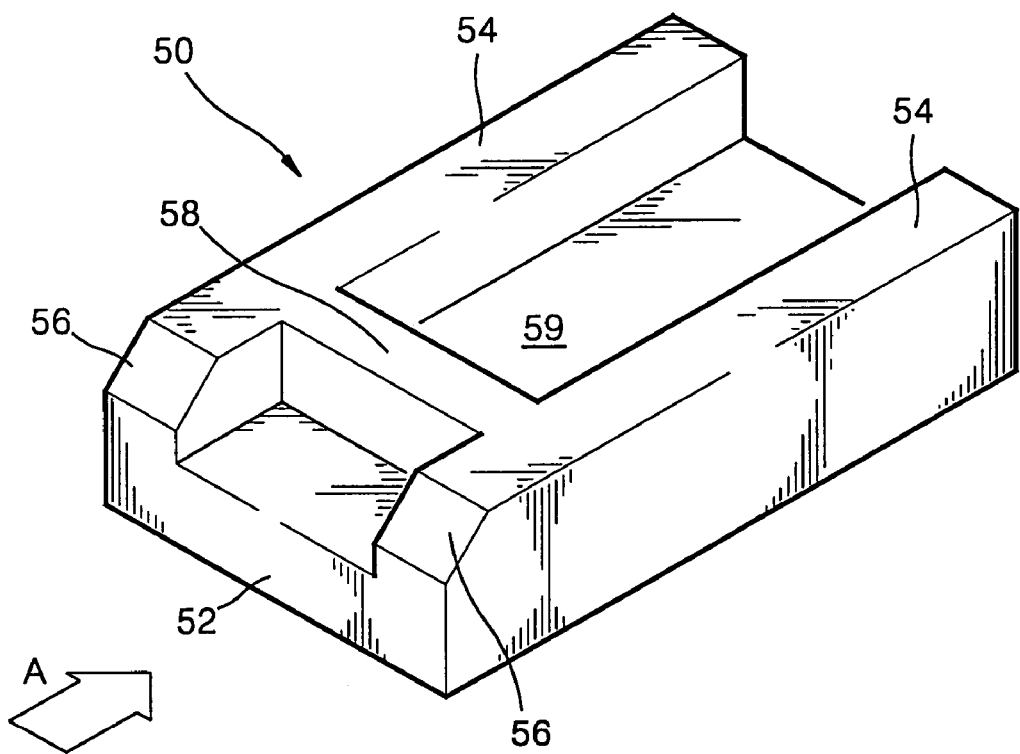
FIG. 3 is a perspective view illustrating a basic structure of a conventional NP type air bearing slider.
Figure 4:
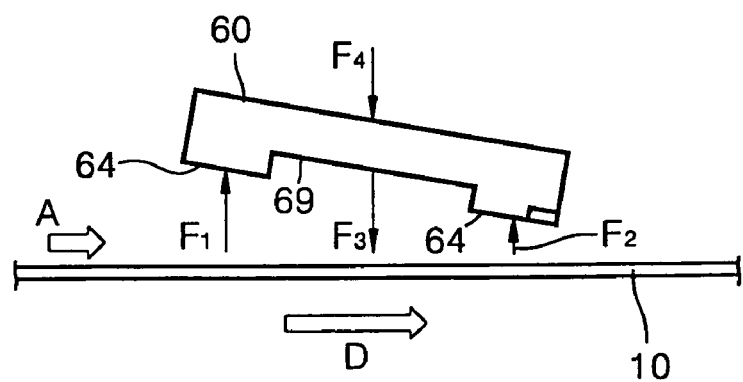
FIG. 4 is a view for explaining forces acting on the NP type air bearing slider during rotation of a disk.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 7A:
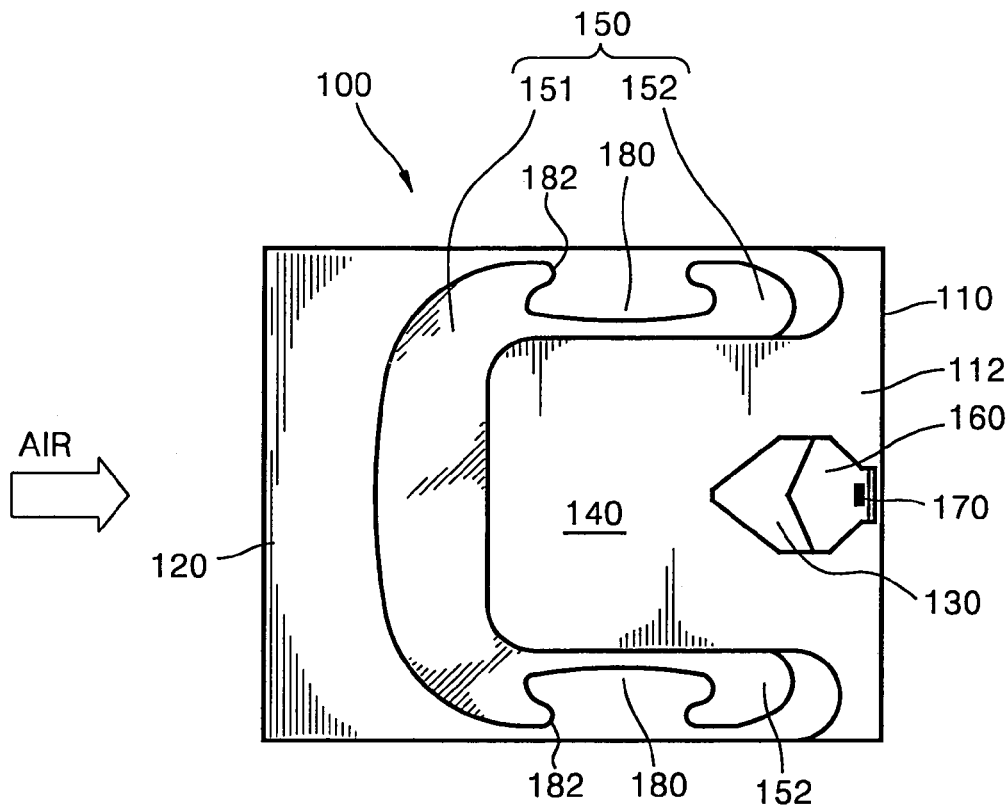
FIGS. 7A and 7B are a plan view and a perspective view, respectively, illustrating an air bearing slider according to a first preferred embodiment of the present invention.
Figure 7B:
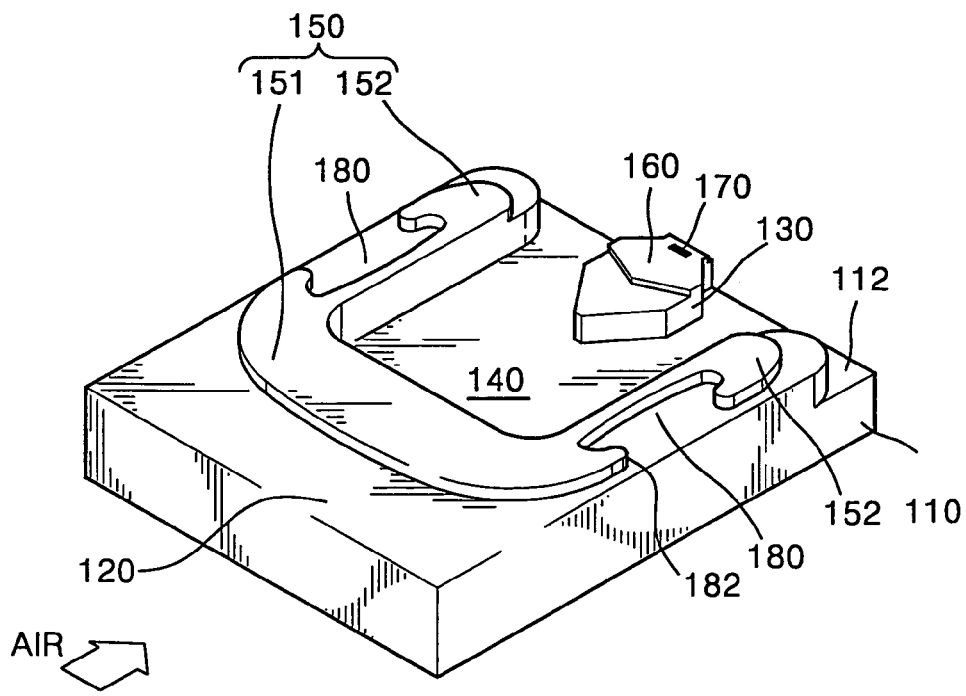

Referring to FIGS. 7A and 7B, an air bearing slider 100 according to a first embodiment of the present invention includes a body 110 having a thin block shape, first and second rail bases 120 and 130, and a negative pressure cavity 140. The first and second rail bases 120 and 130 and the negative pressure cavity 140 are arranged on a surface 112 of the body 110 facing a disk (not shown).

The first rail base 120 protrudes to a predetermined height from the surface 112 of the body 110, for example, a height of about 1–1.5 μm, and has a U shape having one side open to a trailing end portion of the body 110.

A first positive pressure generating rail portion 150 is provided on an upper surface of the first rail base 120. The first positive pressure generating rail portion 150 includes a cross rail 151 and a pair of side rails 152. The cross rail 151 is separated a predetermined distance from a leading end portion of the first rail base 120 where air enters and extends in a first direction perpendicular to a direction in which the air enters, that is, in a widthwise direction of the first rail base 120. The side rails 152 extend in a second direction parallel to the direction in which the air enters, that is, in the lengthwise direction of the first rail base 120, from both ends of the cross rail 151. Thus, the first positive pressure generating rail portion 150 has a U shape like the first rail base 120. The first positive pressure generating rail portion 150 protrudes a predetermined height, for example, about 0.1–0.2 μm, from the upper surface of the first rail base 120. Accordingly, a step is formed between an upper surface of the first positive pressure generating rail portion 150 and the upper surface of the rail base 120.

The second rail base 130 is formed adjacent to the trailing end portion of the body 110 and protrudes a predetermined height, for example, about 1–1.5 μm, from the surface 112 of the body 110. In particular, the height of the second rail base 130 is preferably formed to have the same height as that of the first rail base 120.

A second positive pressure generating rail portion 160 is provided on the upper surface of the second rail base 130. The second positive pressure generating rail portion 160 protrudes a predetermined height, for example, about 0.1–0.2 μm, from an upper surface of the second rail base 130. Accordingly, a step is formed between an upper surface of the second positive pressure generating rail portion 160 and the upper surface of the second rail base 130. The height of the step is preferably the same as that of the step between the first rail base 120 and the first positive pressure generating rail portion 150. A read/write head 170 is mounted on the second positive pressure generating rail portion 160.

The upper surfaces of the first and second positive pressure generating rail portions 150 and 160 function as an air bearing surface (ABS) and generate a lifting force lifting the slider 100 by generating positive pressure. In particular, since the upper surfaces of the first and second rail bases 120 and 130 exist in front of the air bearing surface, the steps are provided between the first and second rail bases 120 and 130 and the air bearing surfaces. A wedge effect is applied to the air entering in direction of the air bearing surface of the slider 100 due to the step so that a sufficient amount of positive pressure can be generated.

The negative pressure cavity 140 is defined by the first rail base 120 and has a function of generating a main negative pressure pulling the slider 100 toward the surface of the disk.

A negative pressure generating pocket 180 for generating an auxiliary negative pressure is formed at each of the side rails 152. The negative pressure generating pocket 180 has a depth much less than that of the negative pressure cavity 140. Preferably, the bottom surface of the negative pressure generating pocket 180 has the same height as the upper surface of the first rail base 120. The negative pressure generating pocket 180 is separated from the negative pressure cavity 140 and is open to the outside of each of the side rails 152 through an open portion 182. The negative pressure generating pocket 180 is preferably formed in a lengthwise direction of the side rails 152 corresponding to the shape of the side rails 152. The length of the open portion 182 is preferably shorter than the negative pressure generating pocket 180. The negative pressure generating pocket 180 generates an auxiliary negative pressure separate from the main negative pressure generated by the negative pressure generating portion 140.

As described above, the air bearing slider 100 according to the present invention includes the negative pressure cavity 140 generating a main negative pressure at around the center of the surface 112 of the body 110 facing the disk and the negative pressure generating pocket 180 generating an auxiliary negative pressure at both sides of the negative pressure cavity 140. In the slider 100 according to the present invention, the area of the negative pressure cavity 140 is reduced compared to the conventional negative pressure cavity. Accordingly, the main negative pressure is reduced by the reduction in the area of the negative pressure cavity 140. However, the reduction in the main negative pressure can be compensated for by the auxiliary negative pressure generated by the negative pressure generating pocket 180. That is, according to the present invention, even when the area of the negative pressure cavity 140 is reduced, a sufficient amount of negative pressure can be generated by the negative pressure cavity 140 and the negative pressure generating pocket 180 so as to be balanced with respect to the positive pressure generated on the air bearing surface. Thus, the flying height of the slider 100 according to the rotation speed of the disk can be constantly maintained.

In particular, the slider 100 according to the present invention includes a negative pressure generating pocket 180 generating an auxiliary negative pressure in addition to the negative pressure cavity generating a main negative pressure. Thus, the flying height of the slider 100 is not lowered even when the altitude increases.

The above-described merit of the present invention can be explained by two characteristics, that is, a difference in lowering of positive pressure and negative pressure according to an increase of the altitude and a change in position where a resultant force of each of the positive pressure and the negative pressure according to an increase of the altitude. These characteristics will be described in detail later.

Figure 8:
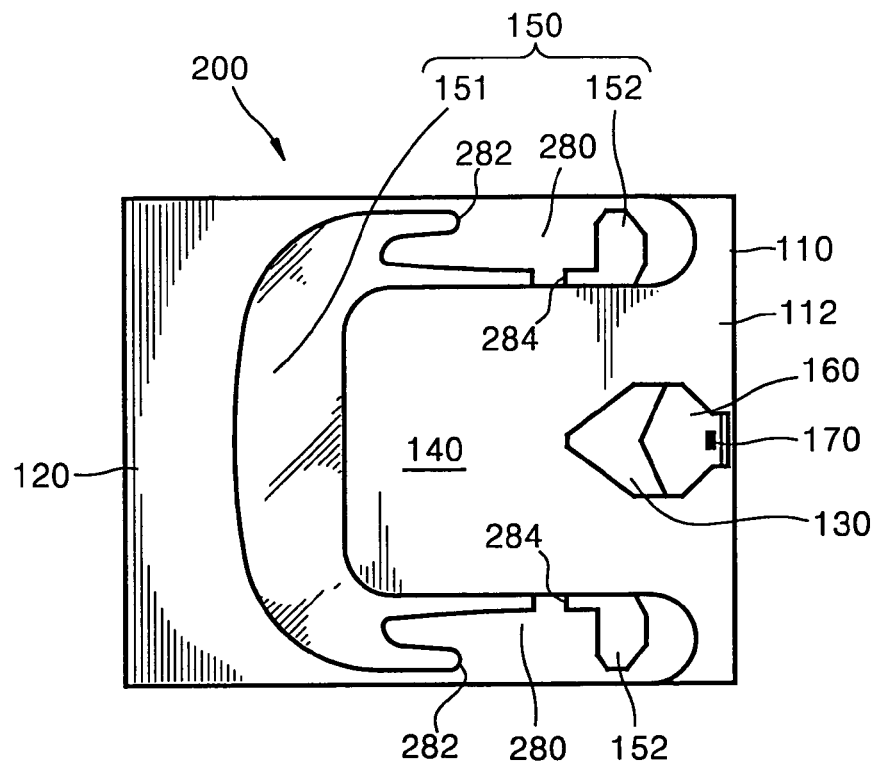
FIG. 8 is a plan view illustrating an air bearing slider according to a second preferred embodiment of the present invention.
Figure 9:
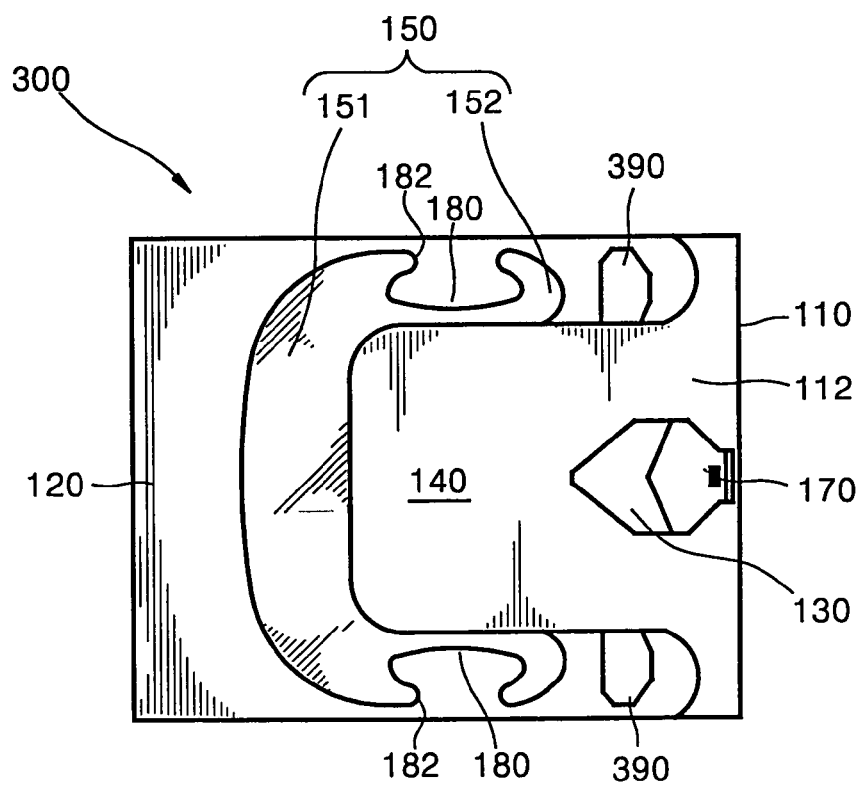
FIG. 9 is a plan view illustrating an air bearing slider according to a third preferred embodiment of the present invention.

FIGS. 8 and 9 illustrate air bearing sliders according to second and third embodiments of the present invention. Since the second and third embodiments have a similar structure to the above-described first embodiment, a difference there between will be briefly described.

Referring first to FIG. 8, in an air bearing slider 200 according to the second preferred embodiment of the present invention, a groove 284 connecting a negative pressure generating pocket 280 and the negative pressure cavity 140 is formed in each of the side rails 152 between a negative pressure generating pocket 280 and the negative pressure cavity 140. The depth of the groove 284 is preferably the same as that of the negative pressure generating pocket 280. Preferably, the length of the groove 284 is sufficiently shorter than that of the negative pressure generating pocket 280.

According to the second embodiment of the present invention, mutual compensation between the main negative pressure generated in the negative pressure cavity 140 and the auxiliary negative pressure generated in the negative pressure generating pocket 280 is made by the groove 284. However, since the groove 284 is formed sufficiently small, the auxiliary negative pressure is not removed by being absorbed by the main negative pressure.

Next, referring to FIG. 9, an air bearing slider 300 according to the third embodiment of the present invention includes a third positive pressure generating rail portion 390 which protrudes on the first rail base 120 at the rear of each of the side rails 152. The third positive pressure generating rail portion 390 is separated a predetermined distance from each of the side rail 152. The third positive pressure generating rail portion 390 is preferably formed on the upper surface of the first rail base 120 to have the same height as the first positive pressure generating rail portion 150.

According to the third embodiment of the present invention, by providing the third positive pressure generating rail portion 390 generating positive pressure at the trailing end portion of the slider 300, the positive pressure at the trailing end portion of the slider 300 where the head 170 is disposed increases so that the lowering of the flying height of the trailing end portion of the slider 300 at a high elevation or altitude place can be effectively restricted.

The characteristic effect and principle of the air bearing slider according to the present invention will now be described with reference to the accompanying drawings.

Figure 10A:
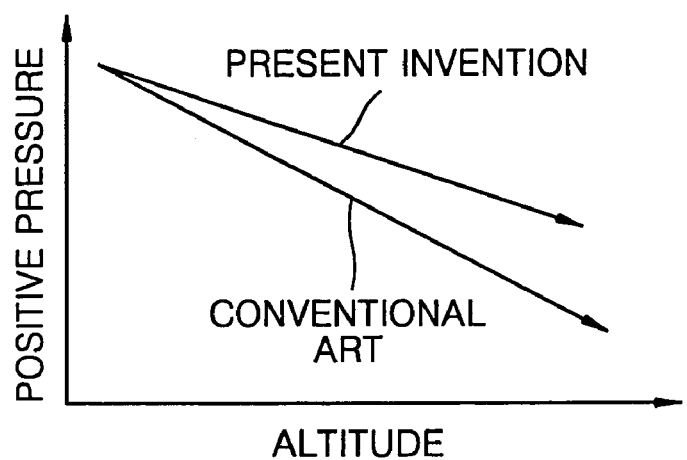
FIG. 10A is a graph showing a change in the positive pressure according to the altitude in the slider of the present invention and the conventional slider.
Figure 10B:
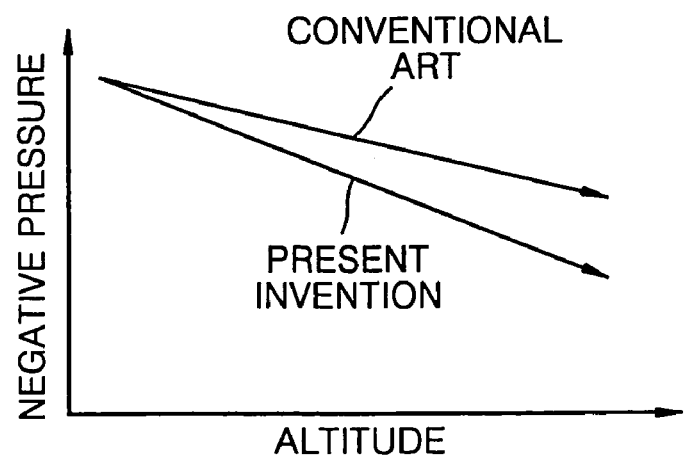
FIG. 10B is a graph showing a change in the negative pressure according to the altitude in the slider of the present invention and the conventional slider.

FIGS. 10A and 10B are graphs respectively showing changes in the positive pressure and the negative pressure according to the elevation or altitude of the slider location according to the present invention and the conventional slider.

In general, as elevation or altitude increases, positive pressure and negative pressure decrease at the same time. Thus, the lowering of the flying height of the slider according to an increase in the elevation or altitude can be reduced by appropriately adjusting a reduction rate of the positive pressure and the negative pressure. That is, making the reduction rate of the positive pressure according to the increase in the elevation or altitude small, while making the reduction rate of the negative pressure great.

In the conventional slider, since the negative pressure cavity is large, a considerable negative pressure is generated as the altitude increases, as shown in FIG. 10B, so that the reduction rate of the negative pressure is small. In contrast, as shown in FIG. 10A, the reduction rate of the positive pressure according to an increase of the altitude is great. As a result, in the conventional slider, the lowering of the flying height of the slider according to an increase in the elevation or the altitude is greatly generated.

However, in the slider according to the present invention which has the negative pressure cavity narrower than that of the conventional art and the negative pressure generating pocket generating the auxiliary negative pressure, a sufficient negative pressure can be generated at a low altitude. Also, at higher altitudes or elevations, the amount of air entering between the slider and the disk decreases such that negative pressure is hardly generated in the negative pressure generating pocket which is shallower than the negative pressure cavity. Thus, as shown in FIG. 10B, the overall reduction rate of the negative pressure according to an increase in the altitude is greater in the present invention than in the conventional art. In contrast, since a sufficient positive pressure is generated at the trailing end portion of each of the side rails formed in the lengthwise direction of the body of the slider, as shown in FIG. 10A, the reduction rate of the positive pressure according to an increase in the altitude is reduced compared to the conventional art.

As described above, in the slider according to the present invention, the positive pressure is reduced less relative to an increase in the altitude while the negative pressure is greatly reduced. Thus, even when the altitude increases, the flying height of the slider hardly decreases or can be minimized.

Figure 11A:
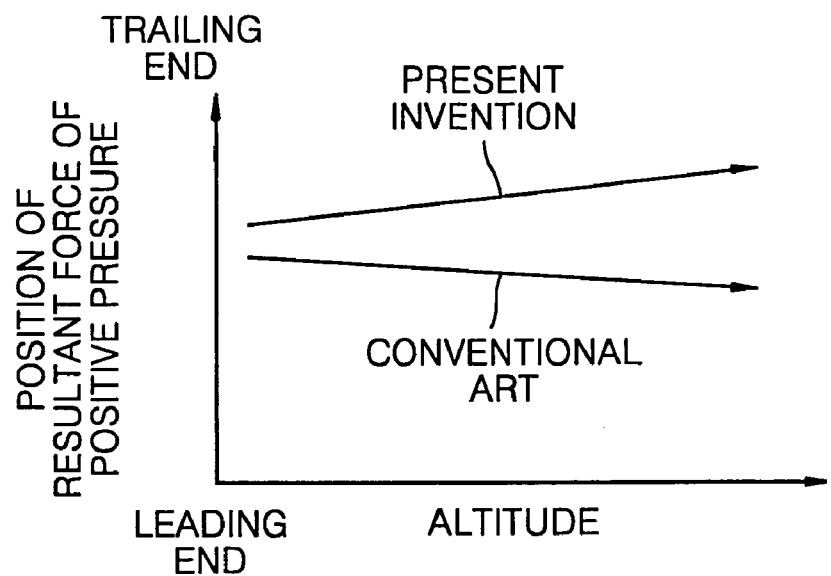
FIG. 11A is a graph showing a change in the position where a resultant force of the positive pressure according to the altitude acts in the slider of the present invention and the conventional slider.
Figure 11B:
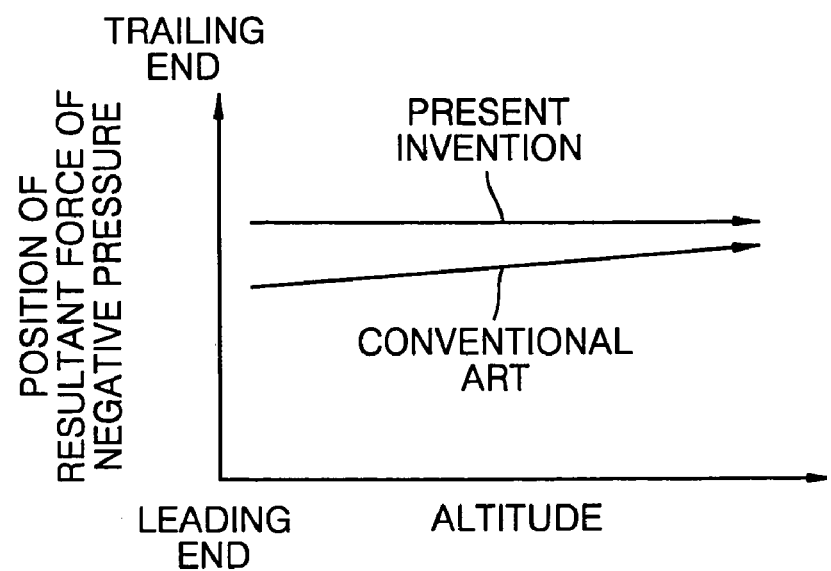
FIG. 11B is a graph showing a change in the position where a resultant force of the negative pressure according to the altitude acts in the slider of the present invention and the conventional slider.

FIGS. 11A and 11B are graphs showing a change in the position of where a resultant force of the positive pressure according to the altitude acts on the slider of the present invention and on the conventional slider, and a change in the position of where a resultant force of the negative pressure acts according to the altitude on the slider of the present invention and the conventional slider, respectively.

As illustrated in FIG. 11A, in the conventional slider, the position where the resultant force of positive pressure acts moves toward the leading end portion of the slider as the altitude increases, and the position where the resultant force of negative pressure acts moves toward the trailing end portion of the slider as the altitude increases, as illustrated in FIG. 11B. Thus, at high altitudes, since the resultant force of positive pressure acts on the leading end portion of the slider and the resultant of negative pressure acts on the trailing end of the slider, the flying height of the trailing end portion of the slider where the head is disposed is lowered.

However, as illustrated in FIG. 11A, in the slider according to the present invention, the position where the resultant force of positive pressure acts moves toward the trailing end portion of the slider as the altitude increases, and the position where the resultant force of negative pressure acts hardly moves although the altitude increases, as illustrated in FIG. 11B. This is because less main negative pressure is generated by the negative pressure cavity having less area compared to the conventional technology and the auxiliary negative pressure hardly moves out of the negative pressure generating pocket.

Thus, at higher altitudes, since the resultant force of positive pressure acts on the trailing end portion of the slider and the resultant force of negative pressure acts on the original position, even when the positive pressure decreases as the altitude increases, lowering of the flying height of the trailing end portion of the slider can be minimized.

Due to the two characteristic features described-above, the reduction rate of the negative pressure is greater than that of the positive pressure due to an increase in the altitude and the position where the resultant force of the positive pressure moves towards the trailing end portion of the slider, in the air bearing slider according to the present invention, the lowering of the flying height of the slider according to an increase in the altitude can be minimized.

Figure 5:
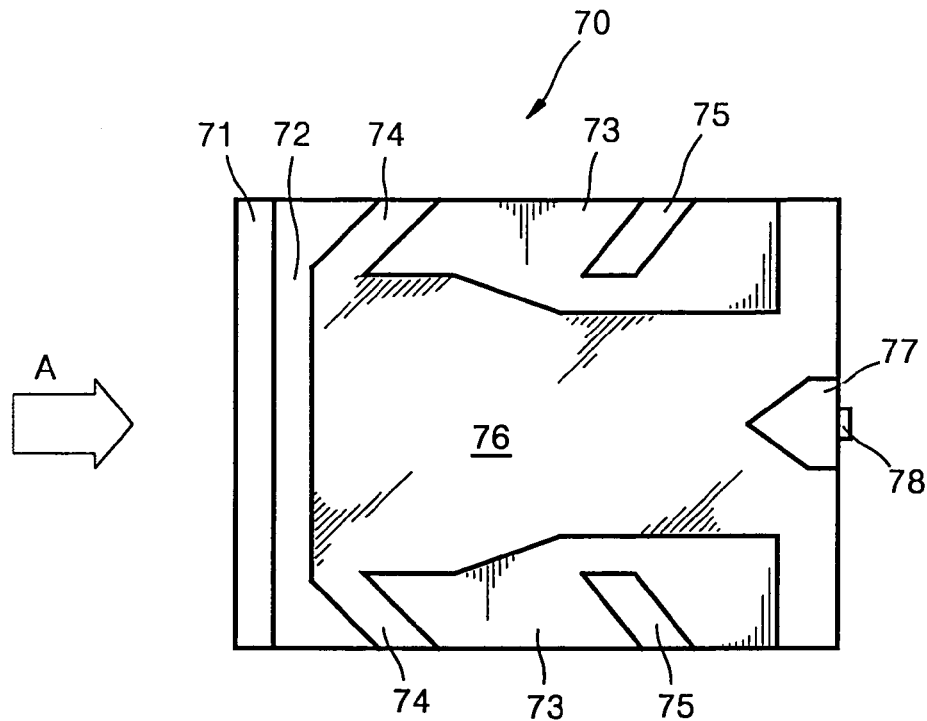
FIG. 5 is a plan view illustrating a detailed example of the conventional NP type air bearing slider.
Figure 6A:
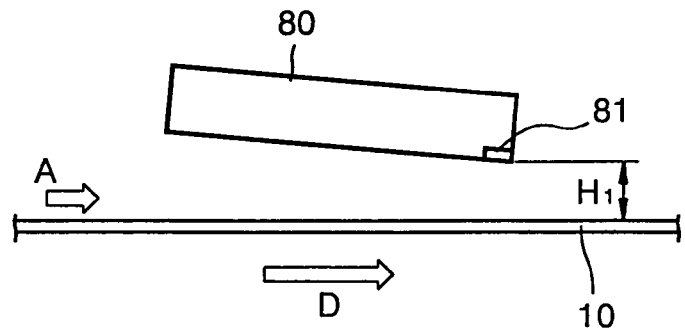
Figure 6B:
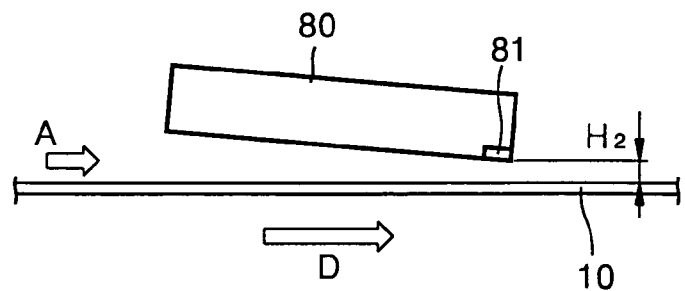
Figure 12:
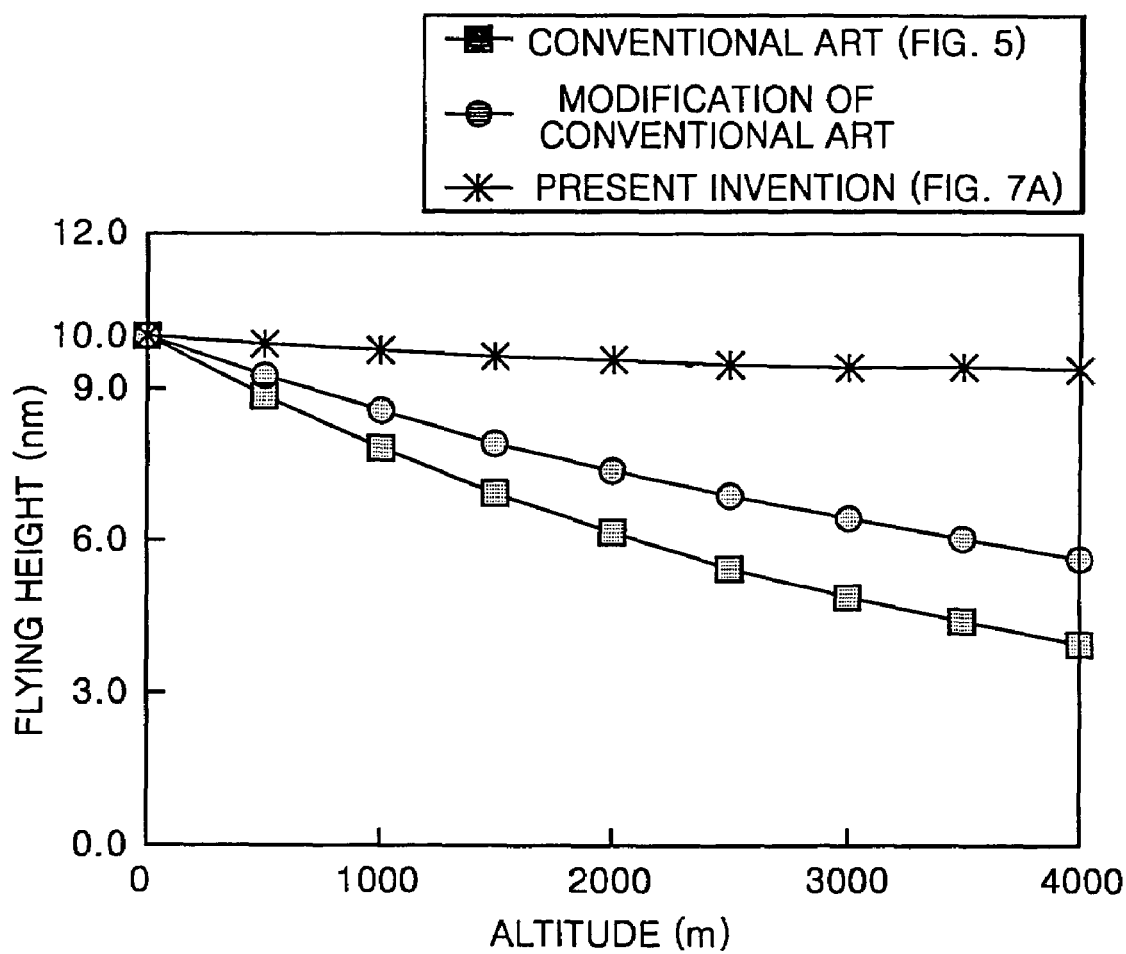
FIG. 12 is a graph showing changes in the flying height of the slider of the present invention and the conventional slider according to the altitude.

FIG. 12 is a graph showing changes in the flying height of the slider of the present invention and the conventional slider relative to the altitude. The graph show changes in the flying height according to an increase in the altitude of three types of sliders, that is, the slider according to the first preferred embodiment of the present invention shown in FIG. 7A, the conventional slider shown in FIG. 5, and a modified slider obtained by removing the first groove from the slider of FIG. 5. The flying heights of all three sliders are set to 10 nm at an altitude of 0 m.

In FIG. 12, it can be seen that lowering of the flying height of the slider according to the first preferred embodiment of the present invention is hardly generated although the altitude increases. However, in the conventional slider having the structure shown in FIG. 5, as the altitude increases, the flying height sharply decreases and the flying height is reduced by about 50% where the altitude is about 3,000 m compared to the present invention. For the modified slider, the flying height also decreases as the altitude increases such that the flying height is reduced by about 30% at the place where the altitude is about 3,000 m relative to the present invention. As a result, it can be seen that, in the conventional slide of FIG. 5, the first groove connecting the negative pressure cavity and the outside of the slider further lowers the flying height according to an increase in the altitude.

Figure 13A:
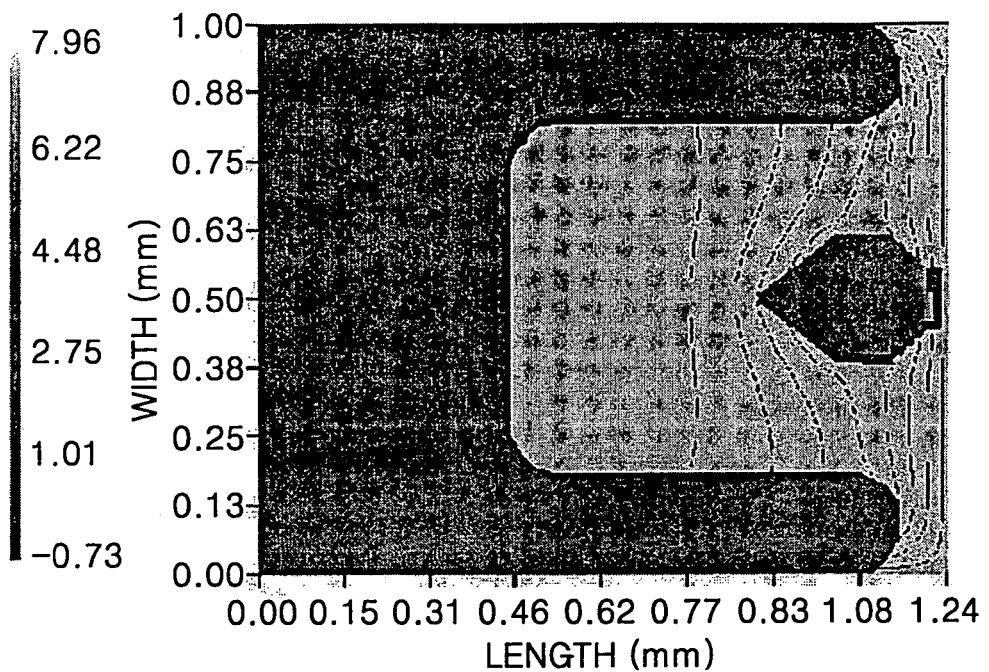
FIGS. 13A and 13B are 2D and 3D views, respectively, showing distribution of pressure in the air bearing slider according to the present invention at a place where the absolute altitude is 0 m.
Figure 13B:
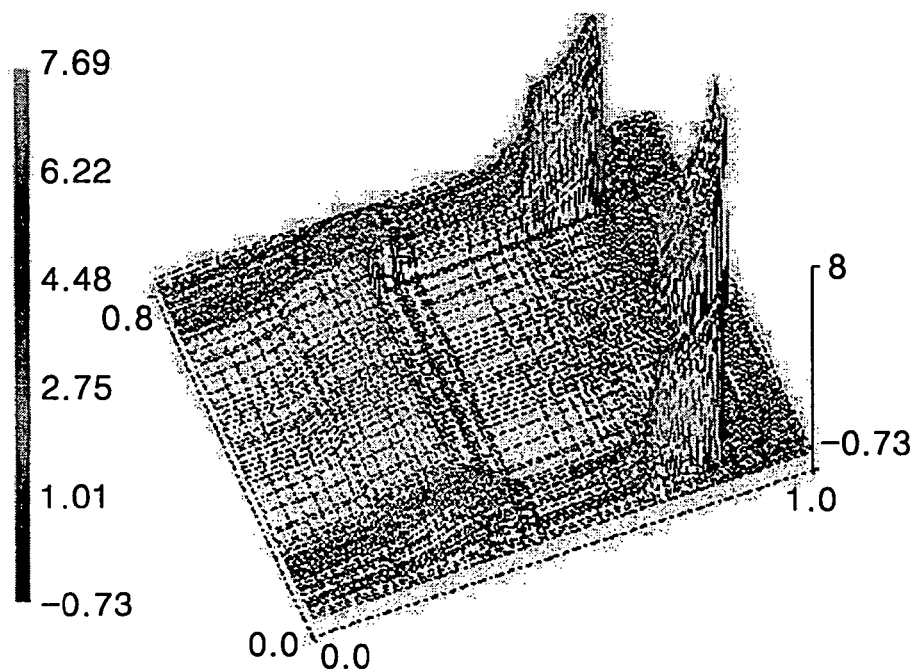
Figure 14A:
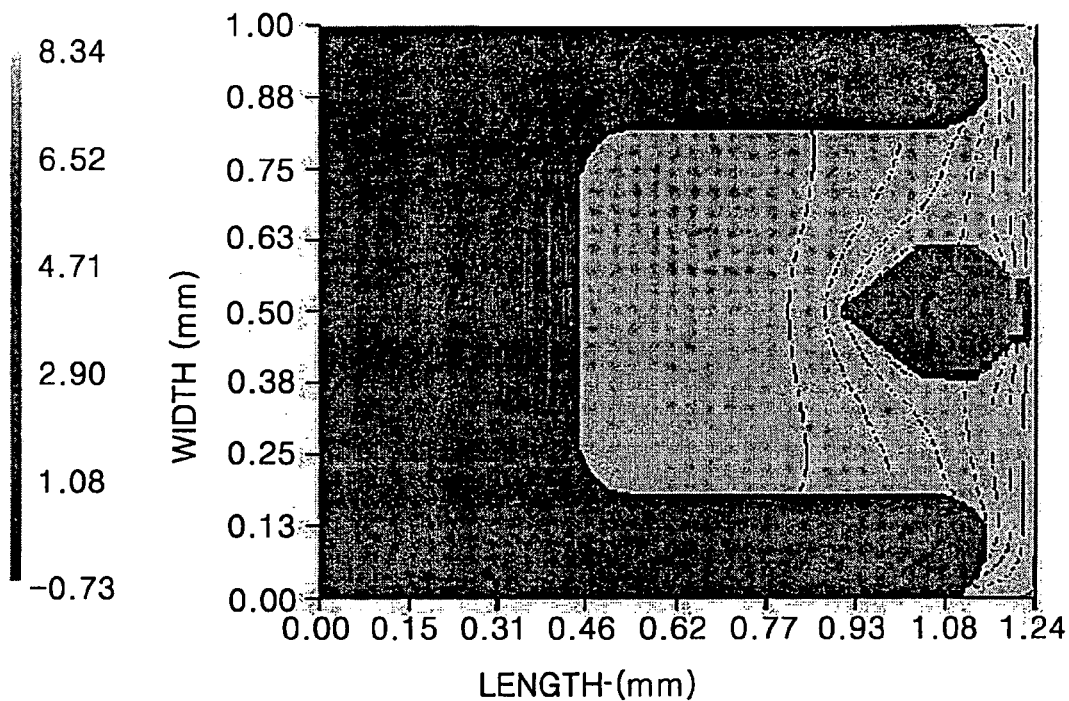
FIGS. 14A and 14B are 2D and 3D views, respectively, showing distribution of pressure in the air bearing slider according to the present invention at a place where the absolute altitude or elevation is about 3,000 m.
Figure 14B:
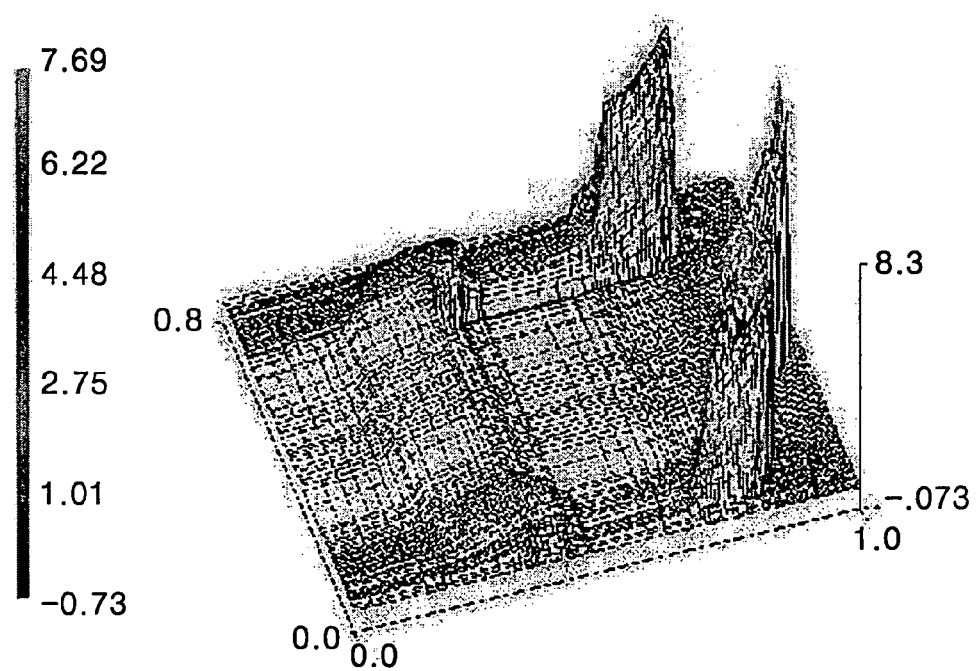

FIGS. 13A and 13B are 2D and 3D views, respectively, showing distribution of pressure in the air bearing slider according to the present invention at a place where the absolute altitude is 0 m. FIGS. 14A and 14B are 2D and 3D views, respectively, showing distribution of pressure in the air bearing slider according to the present invention at a place where the absolute altitude is about 3,000 m.

Referring to the drawings, the air pressure gradually increases from the leading end portion of the body of the slider in a lengthwise direction of the body and high positive pressure is primarily generated on the upper surface of the cross rail. Next, the pressure is sharply decreased in the negative pressure cavity to generate the main negative pressure and the auxiliary negative pressure is generated in the negative pressure generating pocket. Then, the pressure drastically increases at the trailing end portion of each of the side rails to generate very high positive pressure. Also, high positive pressure is generated at the second positive pressure generating rail portion.

It can be seen that there is hardly any change in the position where the negative pressure is generated between places where the altitude is 0 m and 3,000 m. In contrast, as the altitude increases, the positive pressure generated at the trailing end portion of the slider by the side rails and the second positive pressure generating rail portion is slightly higher than those in other portions of the slider.

In the above-described slider according to the present invention, when the altitude is high, the position where the resultant force of positive pressure acts moves toward the trailing end portion of the slider while the position where the resultant force of negative pressure remains the same. Thus, even when the altitude increases and the positive pressure decreases, lowering of the flying height of the trailing end portion of the slider can be minimized.

As described above, according to the air bearing slider of a disk drive according to the present invention, even when the altitude increases, a decrease of the flying height of the slider can be minimized or hardly exists. Thus, since a sufficient flying height can be obtained at a high altitude place, reliability in operation of a disk drive is improved. Also, the conventional problem that the life span of a head is decreased caused by contact between the head and the disk due to a decrease of the flying height of the slider is solved.

While this invention has been particularly shown and described with reference to preferred embodiments thereof, it will be understood by those skilled in the art that various changes in form and details may be made therein without departing from the spirit and scope of the invention as defined by the appended claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An air bearing slider of a disk drive for moving a read/write head to a desired position on a disk by being lifted above a surface of the disk, the air bearing slider comprising:
   a body having a surface facing the disk;
   a first rail base protruding from the surface of the body facing the disk and having a U shape open to a trailing end portion of the body;
   a first positive pressure generating rail portion protruding from the first rail base and including a cross rail separated from a leading end portion of the first rail base and extending in a first direction perpendicular to a direction in which air enters and a pair of side rails respectively extending from both end portions of the cross rail in a second direction parallel to the direction in which air enters;
   a negative pressure cavity defined by the first rail base;
   a second rail base protruding from the surface of the body facing the disk adjacent to the trailing end portion of the body;
   a second positive pressure generating rail portion protruding from the second rail base; and
   a negative pressure generating pocket formed in each of the side rails to be separated from the negative pressure cavity and open to an outside of the side rails.

2. The air bearing slider as claimed in claim 1, wherein the negative pressure generating pocket is formed shallower than the negative pressure cavity.

3. The air bearing slider as claimed in claim 2, wherein a bottom surface of the negative pressure generating pocket is formed to have a same height of an upper surface of the first rail base.

4. The air bearing slider as claimed in claim 1, wherein the negative pressure generating pocket is formed in a lengthwise direction of the side rails.

5. The air bearing slider as claimed in claim 1, wherein the negative pressure generating pocket is open to the outside of the side rails through an open portion and a length of the open portion is shorter than a length of the negative pressure generating pocket.

6. The air bearing slider as claimed in claim 1, wherein the first rail base and the second rail base are formed to have a same height.

7. The air bearing slider as claimed in claim 6, wherein a step between the first rail base and the first positive pressure generating rail portion and a step between the second rail base and the second positive pressure generating rail portion have a same height.

8. The air bearing slider as claimed in claim 1, wherein a groove connecting the negative pressure generating pocket and the negative pressure cavity is formed in each of the side rails between the negative pressure generating pocket and the negative pressure cavity.

9. The air bearing slider as claimed in claim 8, wherein a depth of the groove connecting the negative pressure generating pocket and the negative pressure cavity is the same as a depth of the negative pressure generating pocket.

10. The air bearing slider as claimed in claim 8, wherein a length of the groove is shorter than a length of the negative pressure generating pocket.

11. The air bearing slider as claimed in claim 1, wherein a third positive pressure generating rail portion protruding on the first rail base is provided at the rear of each of the side rails and the third positive pressure generating rail portion is separated from each of the side rails.

12. The air bearing slider as claimed in claim 11, wherein the third positive pressure generating rail portion is formed on an upper surface of the first rail base to have a same height as the first positive pressure generating rail portion.

13. The air bearing slider as claimed in claim 1, wherein the first rail base protrudes between 1 to 1.5 µm from the body surface.

14. The air bearing slider as claimed in claim 1, wherein the first positive pressure generating rail portion protrudes between 0.1 to 0.2 µm from an upper surface of the first rail base.

15. The air bearing slider as claimed in claim 1, wherein the second rail base portion protrudes between 1 to 1.5 µm from the body source.

16. The air bearing slider as claimed in claim 1, wherein the second positive pressure generating rail portion protrudes between 0.1 to 0.2 µm from an upper surface of the second rail base.

17. A hard disk drive comprising:
a hard disk;
a spindle motor rotating the hard disk;
a read/write head recording data onto the hard disk or reproducing data from the hard disk; and
an actuator moving the read/write head to a predetermined position on the hard disk, the actuator further comprising an actuator arm rotated by a voice coil motor, an air bearing slider where the read/write head is mounted, and a suspension installed at one end portion of the actuator arm and supporting the air bearing slider elastically biased toward a surface of the hard disk, wherein the air bearing slider comprises:
a body having a surface facing the hard disk,
a first rail base protruding from the surface of the body facing the hard disk and having an opening extending from a trailing end portion of the body to a midsection of the body,
a first positive pressure generating rail portion protruding from the first rail base and including a cross rail separated from a leading end portion of the first rail base and extending in a first direction perpendicular to a direction in which air enters and a pair of side rails extending from both ends portion of the cross rail in a second direction parallel to the direction in which air enters,
a negative pressure cavity defined by the first rail base,
a second rail base protruding from the surface of the body facing the disk adjacent to the trailing end portion of the body,
a second positive pressure generating rail portion protruding from the second rail base, and
a negative pressure generating pocket formed in each of the side rails to be separated from the negative pressure cavity and open to an outside of the side rails.

18. A method of forming an air bearing slider of a disk drive for moving a read/write head to a desired position on a disk, the method comprising:
forming a body having a surface facing the disk;
forming a first rail base protruding from the surface of the body facing the disk, the first rail comprising an open area extending along a trailing end portion of the body to a midsection of the body;
forming a first positive pressure generating rail portion protruding from the first rail base and including a cross rail separated from a leading end portion of the first rail base and extending in a first direction perpendicular to a direction in which air enters and a pair of side rails extending from both end portions of the cross rail in a second direction parallel to the direction in which air enters;
forming a negative pressure cavity defined by the first rail base;
forming a second rail base protruding from the surface of the body facing the disk adjacent to the trailing end portion of the body;
forming a second positive pressure generating rail portion protruding from the second rail base; and
forming a negative pressure generating pocket formed in each of the side rails to be separated from the negative pressure cavity and open to an outside of the side rails.

19. An air bearing slider of a disk drive for moving a read/write head to a desired position on a disk, the air bearing slider comprising:
a body having a surface facing the disk;
a first rail base protruding from the surface of the body facing the disk comprising an open area extending along a trailing end portion of the body to a midsection of the body;
a first positive pressure generating rail portion protruding from the first rail base and including a cross rail separated from a leading end portion of the first rail base and extending in a first direction perpendicular to a direction in which air enters and a pair of side rails extending from both end portions of the cross rail in a second direction parallel to the direction in which air enters;
a negative pressure cavity defined by the first rail base;

a second rail base protruding from the surface of the body facing the disk adjacent to the trailing end portion of the body;

a second positive pressure generating rail portion protruding from the second rail base; and a negative pressure generating pocket formed in each of the side rails to be separated from the negative pressure cavity and open to an outside of the side rails.

20. The air bearing slider of a disk drive according to claim 19, further comprising a third positive pressure generating rail portion generating positive pressure at the trailing end portion of the body.

* * * * *